US012610169B2

(12) United States Patent
Wang et al.

(10) Patent No.: US 12,610,169 B2
(45) Date of Patent: Apr. 21, 2026

(54) MICROPHONE MODULE

(71) Applicant: AAC ACOUSTIC TECHNOLOGIES (SHENZHEN) CO., LTD., Shenzhen (CN)

(72) Inventors: Dexing Wang, Shenzhen (CN); Jinyu Zhang, Shenzhen (CN); Yuanhua Tang, Shenzhen (CN); Shaoping Huang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 155 days.

(21) Appl. No.: 18/764,339

(22) Filed: Jul. 4, 2024

(65) Prior Publication Data

US 2025/0227402 A1 Jul. 10, 2025

Related U.S. Application Data

(63) Continuation of application No. PCT/CN2024/076026, filed on Feb. 5, 2024.

(30) Foreign Application Priority Data

Jan. 5, 2024 (CN) ......................... 202420033699.0

(51) Int. Cl.
*H04R 1/40* (2006.01)
*H04R 1/04* (2006.01)
*H04R 1/08* (2006.01)

(52) U.S. Cl.
CPC ................. *H04R 1/08* (2013.01); *H04R 1/04* (2013.01); *H04R 2201/003* (2013.01); *H04R 2499/13* (2013.01)

(58) Field of Classification Search
CPC ........ H04R 1/222; H04R 1/28; H04R 1/2807; H04R 1/2823; H04R 1/2838;
(Continued)

(56) References Cited

U.S. PATENT DOCUMENTS 3,004,103 A * 10/1961 Hart ....................... H04R 1/406 381/91
5,526,430 A * 6/1996 Ono ....................... H04R 1/406 381/26

(Continued)

FOREIGN PATENT DOCUMENTS

CN 101374367 A * 2/2009 ............. H04R 1/406

*Primary Examiner* — Ryan Robinson
(74) *Attorney, Agent, or Firm* — Wiersch Law Group

(57) ABSTRACT

The present disclosure discloses a microphone module including at least two MEMS microphones, a printed circuit board, and a shell, each of the MEMS microphones is provided a sound inlet hole, a plurality of first sound pickup holes are provided on the printed circuit board, a plurality of second sound pickup holes are provided on the shell, each of the first sound pickup holes is communicating with the corresponding sound inlet hole and the corresponding second sound pickup hole, a diameter dimension of each of the first sound pickup holes is D1 mm, a distance between a center axes of adjacent sound inlet holes is greater than or equal to 25D1 mm and less than or equal to 43D1 mm. Compared with the related art, the microphone module disclosed by the present disclosure could have a better sound recognition effect.

10 Claims, 4 Drawing Sheets

(58) Field of Classification Search
CPC ...... H04R 1/2846; H04R 1/2892; H04R 1/30; H04R 1/326; H04R 1/36; H04R 1/406; H04R 2201/403; H04R 2499/13
See application file for complete search history.

(56) References Cited

U.S. PATENT DOCUMENTS

| | | | | |
|---|---|---|---|---|
| 8,280,092 | B2 * | 10/2012 | Inoda | H04R 1/083<br>381/357 |
| 8,682,018 | B2 * | 3/2014 | Burnett | H04R 1/406<br>704/226 |
| 9,191,735 | B2 * | 11/2015 | Andre | H04R 1/406 |
| 9,357,292 | B2 * | 5/2016 | Huang | H04R 1/406 |
| 9,668,055 | B2 * | 5/2017 | Baggio | H04R 1/406 |
| 2009/0213557 | A1 * | 8/2009 | Wen | H05K 3/301<br>381/365 |
| 2017/0236547 | A1 * | 8/2017 | Baggio | H04R 3/005<br>381/26 |
| 2021/0250684 | A1 * | 8/2021 | Sonogi | H04R 1/086 |

* cited by examiner

MICROPHONE MODULE

FIELD OF THE PRESENT DISCLOSURE

The present disclosure relates to a microphone module, in particular to the microphone module with a plurality of MEMS microphones.

DESCRIPTION OF RELATED ART

With the rapid development of intelligent technology, the development of speech recognition technology is becoming more and more critical, which also puts forward higher requirements for the recognition ability of microphone modules. MEMS (Micro Electro Mechanical System) microphone in the microphone module is a microphone manufactured based on MEMS technology, which has many advantages such as small mass and lightweight, and is used in many fields, such as in the field of cell phones and automobiles.

The microphone module in the prior art has only one MEMS microphone, which has a poor sound receiving effect, resulting in a recognition of sound that is difficult to meet current needs. Another existing microphone module comprises a plurality of MEMS microphone units and an outer structural member respectively fixing with the MEMS microphone units. When the MEMS microphone units are assembled with the outer structural members, the assembly of the MEMS microphone units with the outer structural members will produce an additional front cavity which has a greater impact on the microphone module pickup audio loudness, and therefore some constraints need to be placed on the structure of the front cavity and the spacing between the plurality of the MEMS microphone units.

Thus, it is necessary to provide a novel microphone module with a better sound recognition effect.

SUMMARY OF THE DISCLOSURE

The present disclosure is to provide a MEMS microphone with a better sound recognition effect.

For achieving the object mentioned above, the disclosure provides a microphone module, including at least two MEMS microphones, a printed circuit board, and a shell, the MEMS microphones are spaced apart from each other, each of the MEMS microphones is provided a sound inlet hole, the printed circuit board is located between the MEMS microphones and the shell, each of the MEMS microphones is electrically with the printed circuit board, a plurality of first sound pickup holes are provided on the printed circuit board, each of the first sound pickup holes is corresponding to the sound inlet hole in each of the MEMS microphones, a plurality of second sound pickup holes are provided on the shell, each of the second sound pickup holes is corresponding to each of the first sound pickup holes, each of the first sound pickup holes is communicating with the corresponding sound inlet hole and the corresponding second sound pickup hole, a diameter dimension of each of the first sound pickup holes is D1 mm, a distance between a center axes of adjacent sound inlet holes is greater than or equal to 25 D1 mm and less than or equal to 43 D1 mm.

Further, the diameter dimension of each of the first sound pickup holes is greater than a diameter dimension of each of the sound inlet holes, a diameter dimension of each of the second pickup holes is greater than the diameter dimension of each of the first sound pickup holes.

Further, each of the second sound pickup holes is in a conical funnel type, a neck portion of each of the second sound pickup holes in the conical funnel type is located between the corresponding first sound pickup hole and a conical portion of the second sound pickup hole in the conical funnel type.

Further, the shell comprises a substrate and a plurality of sealing rings, there is a plurality of mounting portions corresponding to the sealing rings and provided on the substrate, each of the sealing rings is accommodated in the corresponding mounting portion, the printed circuit board is connected with the sealing rings, a center hole of each of the sealing rings is served as the neck portion of the corresponding second sound pickup hole in the conical funnel type, there is a plurality of first through holes provided on the substrate, each of the center holes and each of the first through holes are in one-to-one correspondence, each of the first through holes is served as the conical portion of the second sound pickup hole in the conical funnel type.

Further, each of the sealing rings is threaded in the corresponding mounting portion or is an interference fit with the corresponding mounting portion.

Further, a distance between the neck portion of each of the second sound pickup holes in the conical funnel type is greater than or equal to 4D1 mm and less than or equal to 5D1 mm.

Further, all of the MEMS microphones are set along the same straight line in the same order.

Further, a distance between a surface of a side of the printed circuit board close to the shell and a surface of a side of the shell away from the printed circuit board is less than 7 mm.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, and technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
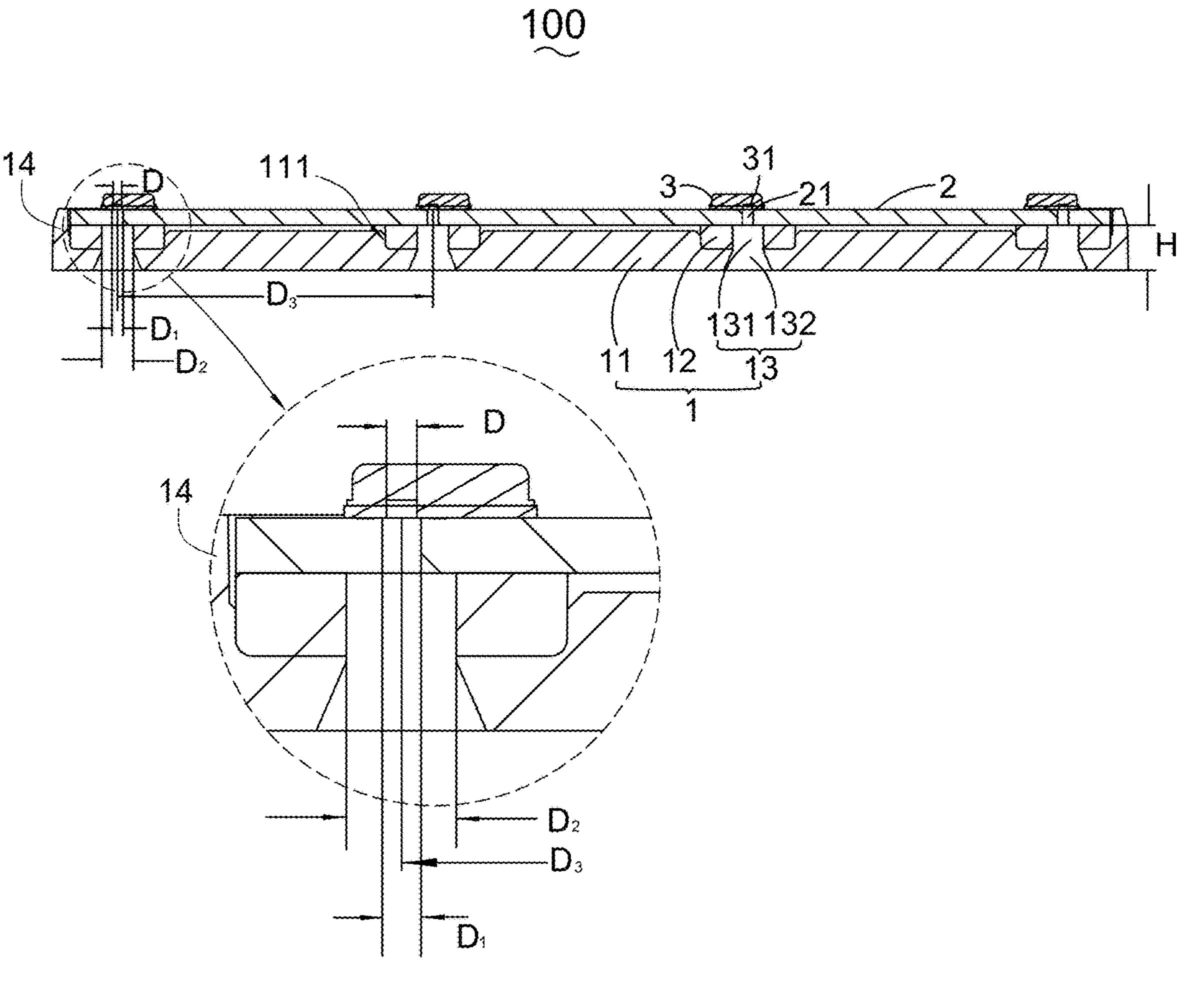
FIG. 1 is a cross-sectional view of a microphone module in accordance with a first embodiment of the present disclosure.
Figure 2:
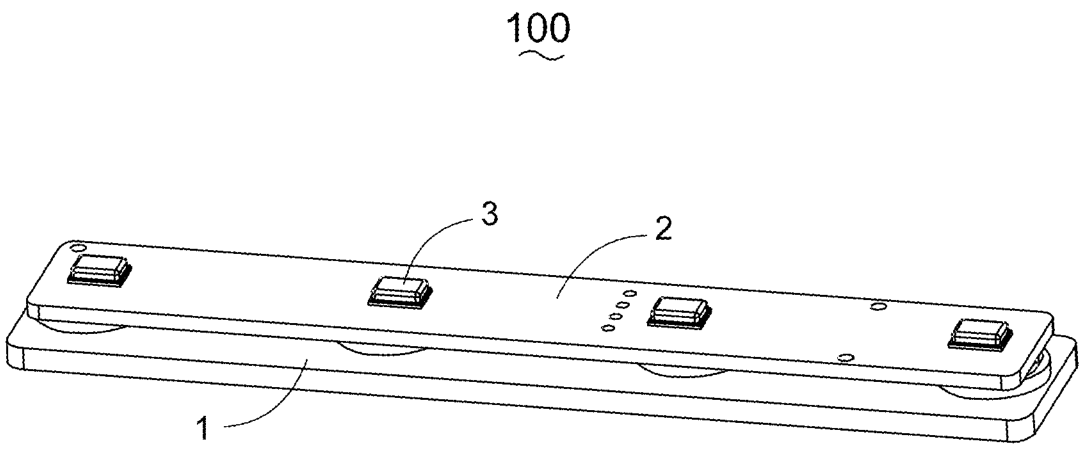
FIG. 2 is an isometric view of a microphone module in accordance with a second embodiment of the present disclosure.

Referring to FIG. 1, the present disclosure discloses a microphone module 100, which includes a shell 1, a printed circuit board 2 and at least two MEMS microphones 3. The MEMS microphones 3, the printed circuit board 2 and the shell 1 are disposed in order from top to bottom, the printed circuit board 2 is located between the MEMS microphones 3 and the shell 1. Each of the MEMS microphones is spaced apart from each other. There is a sound inlet hole provided on each of the MEMS microphones 3, and each of the MEMS microphones is electrically connected with the printed circuit board 2. A plurality of first sound pickup holes 21 are provided on the printed circuit board 2, each of the first sound pickup holes 21 is corresponding to the sound inlet hole 21 in each of the MEMS microphones 3, a plurality of second pickup holes 13 are provided on the shell 1, each of the second sound pickup holes 13 is corresponding to each of the first sound pickup holes 21, each of the first sound pickup holes 21 is communicating with the corresponding sound inlet hole 31 and the corresponding second sound pickup hole 13.

An amount of the MEMS microphones is at least three, there is four MEMS microphones 3 in the present embodiment. All of the MEMS microphones 3 are accommodated on the printed circuit board 2, the printed circuit board 2 is one piece, the printed circuit board 2 is accommodated on the shell 1, the shell 1 is one piece. There is no limit to the connection method between the MEMS microphones 3 and the printed circuit board 2, and between the printed circuit board 2 and the shell 1, e.g., by means of adhesive bonding or soldering. There is a plurality of the first sound pickup holes 21 provided on the printed circuit board 2, the plurality of the first sound pickup holes 21 permeate an upper surface to a lower surface of the printed circuit board 2. There is a plurality of the second sound pickup holes 13 provided on the shell 1, the plurality of the second sound pickup holes 13 permeate an upper surface to a lower surface of the shell 1. An amount of the first sound pickup holes 21 is the same as the amount of the second sound pickup holes 13 and the amount of the MEMS microphones 3. Each of the sound inlet holes 31 and each of the first sound pickup holes 21 are provided in one-to-one correspondence, each of the first sound pickup holes 21 and each of the second sound pickup holes 13 are provided in one-to-one correspondence. The sound is transmitted through the plurality of second sound pickup holes 13 and the plurality of first sound pickup holes 21 to the plurality of sound inlet holes 31.

A diameter dimension of each of the first sound pickup holes 21 is greater than a diameter dimension of each of the sound inlet holes 31, a diameter dimension of each of the second pickup holes 13 is greater than the diameter dimension of each of the first sound pickup holes 21.

Each of the second sound pickup holes 13 includes an upper sound pickup hole 131 and a lower sound pickup hole 132, each of the upper sound pickup holes 131 are located on an upper side of each of the lower sound pickup holes 132, each of the upper sound pickup holes 131 is communicating with the corresponding lower sound pickup hole 132.

Each of the second sound pickup holes 13 is in a conical funnel type, each of the second sound pickup holes 13 in a conical funnel type includes a neck portion and a conical portion connected with the neck portion, each of the neck portion is corresponding to each of the first sound pickup holes 21, the neck portion is located at an upper side of conical portion. In the other embodiment, each of the second sound pickup holes 13 is a flared pickup hole.

Optionally, the shell 1 includes a substrate 11 and a plurality of sealing rings 12, the left and right ends of the substrate 11 have baffles 14, and the printed circuit board 2 is located in the middle of the left baffle and the right baffle 14. In a second embodiment, the baffles may be omitted. As shown in FIGS. 2-5, a schematic diagram of the substrate 11 without the baffles is shown.

Figure 3:
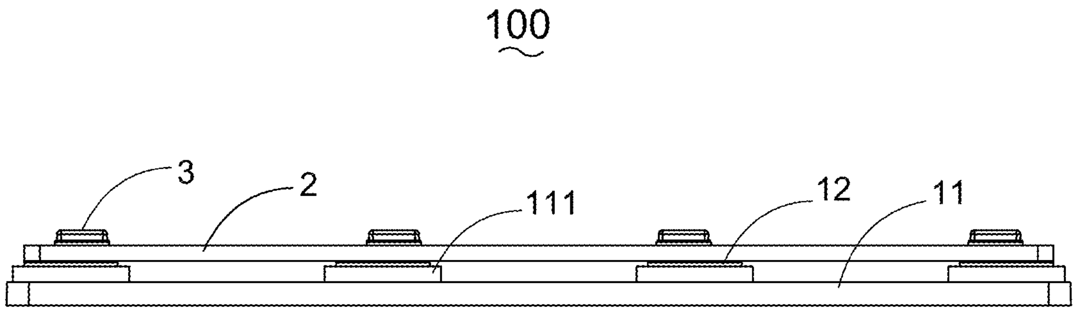
FIG. 3 is a front view of the microphone module in FIG. 2.
Figure 4:
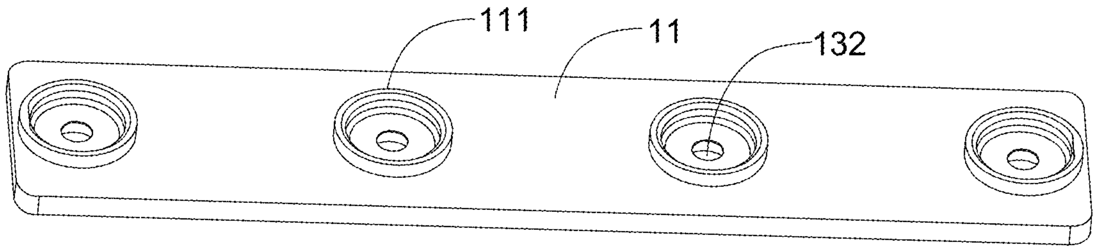
FIG. 4 is an isometric view of a substrate of the microphone module in FIG. 2.
Figure 5:
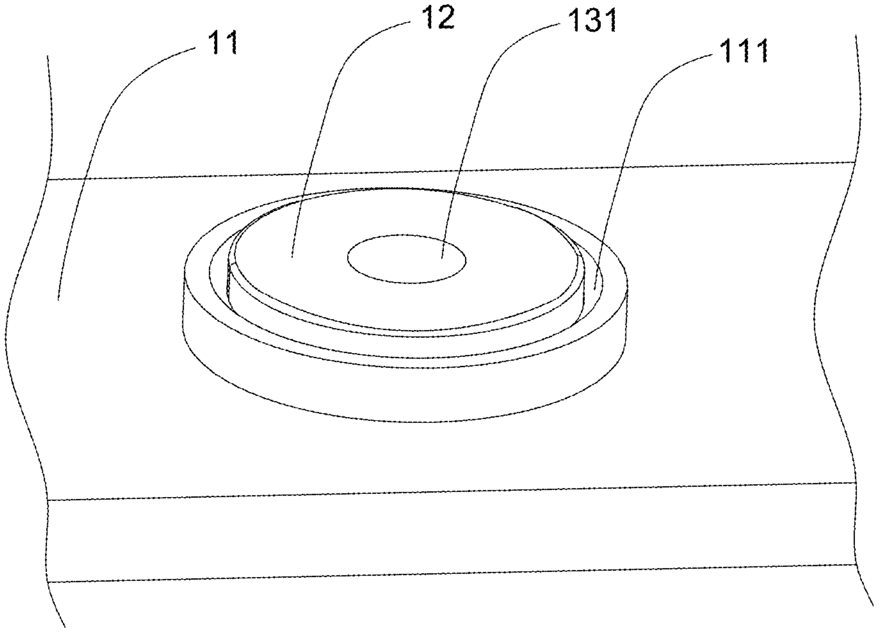
FIG. 5 is a partial structural view of a shell of a microphone module illustrating a positional relationship between a sealing ring and the substrate.

As shown in FIG. 1, there is a plurality of mounting portions 111 corresponding to the sealing rings 12 and provided on the substrate 11, each of the sealing rings 12 is accommodated in the corresponding mounting portion 111, each of the sealing rings 12 protrude from the corresponding mounting portion 111, optionally, each of the sealing rings may also be flush with the corresponding mounting portion. Each of the mounting portions 111 is a recess provided on the substrate 11. Specifically, each of the sealing rings 12 is threaded in the corresponding mounting portion 111 or is an interference fit with the corresponding mounting portion 111. The amount of the mounting portions 111 is the same as the amount of the sealing rings 12 and the amount of the MEMS microphones 3. The printed circuit board 2 is connected with an upper end of each of the sealing rings 12. There is a plurality of first through holes provided on the substrate 11, a center hole in each of the sealing rings 12 and each of the first through holes are in one-to-one correspondence, each of the first through holes is communicating with the corresponding center hole in the sealing rings 12, thereby forming the second sound pickup hole 13. As shown in FIG. 3, each of the center hole in the sealing rings 12 is served as the neck portion of the second sound pickup hole in the conical funnel type, i.e., as the upper sound pickup hole 131. Each of the first through hole is served as the conical portion of each of the second sound pickup holes in the conical funnel type, i.e., as the lower sound pickup hole 132. In the second embodiment, as shown in FIGS. 2-5, each of the mounting portions 111 protrudes from the substrate 11.

A diameter dimension of each of the sound inlet holes 31 is D mm, a diameter dimension of each of the first sound pickup holes 21 is D1 mm, the diameter dimension of each of the sound inlet holes 31 D mm is greater than the diameter dimension of each of the first sound pickup holes 21 D1 mm, thereby, the sound recognition effect is ensured. In this embodiment, an aperture size of each of the upper sound pickup holes 131 is D2 mm, D2 mm is greater than 4D1 mm (4D1 mm means 4 times of D1 mm) and less than or equal to 5D1 mm. Preferably, the aperture size D2 of each of the upper sound pickup holes 131 is 2-3 mm.

A distance between a center axes of the sound inlet holes 31 of the adjacent the MEMS microphones 3 is D3 mm, D3 mm is greater than or equal to 25D1 mm and less than or equal to 43D1 mm, therefore, the microphone module could be made to realize picking up sounds at different positions, effectively improving the sound recognition effect. Preferably, the distance D3 mm between the center axes of the sound inlet holes 31 of the adjacent the MEMS microphones 3 is 20-30 mm. The distance between a surface of a side of the printed circuit board 2 close to the shell 1 and a surface of a side of the shell 1 away from the printed circuit board 2 is less than 7 mm.

In this embodiment, all of the MEMS microphones 3 are set along the same straight line in the same order.

The microphone module 100 provided in this embodiment adopts at least two MEMS microphones 3, cooperating with one PCB board 2 and one shell 1. The sensing of sound wave is realized via the sound inlet holes 31 on each of the MEMS microphone 3, each of the first sound pickup holes 21 on the printed circuit board 2, and each of the second sound pickup holes 13 on the shell 1. Through the plurality of acoustic wave sensing structures, the microphone module 100 is made to receive sound well, which improves the effect of recognizing sound. When the microphone module is provided in this embodiment applied in the field of automobiles, sounds from different locations in the car could be picked up.

It is to be understood, however, that even though numerous characteristics and advantages of the present exemplary embodiment have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A microphone module, comprising:

at least two MEMS microphones;

a printed circuit board; and a shell; wherein the MEMS microphones are spaced apart from each other, each of the MEMS microphones is provided a sound inlet hole, the printed circuit board is located between the MEMS microphones and the shell, each of the MEMS microphones is electrically with the printed circuit board, a plurality of first sound pickup holes are provided on the printed circuit board, each of the first sound pickup holes is corresponding to the sound inlet hole in each of the MEMS microphones, a plurality of second sound pickup holes are provided on the shell, each of the second sound pickup holes is corresponding to each of the first sound pickup holes, each of the first sound pickup holes is communicating with the corresponding sound inlet hole and the corresponding second sound pickup hole, a diameter dimension of each of the first sound pickup holes is D1 mm, a distance between a center axes of adjacent sound inlet holes is greater than or equal to 25D1 mm and less than or equal to 43D1 mm.

2. The microphone module as described in claim 1, wherein the diameter dimension of each of the first sound pickup holes is greater than a diameter dimension of each of the sound inlet holes, a diameter dimension of each of the second pickup holes is greater than the diameter dimension of each of the first sound pickup holes.

3. The microphone module as described in claim 2, wherein each of the second sound pickup holes is in a conical funnel type, a neck portion of each of the second sound pickup holes in the conical funnel type is located between the corresponding first sound pickup hole and a conical portion of the second sound pickup hole in the conical funnel type.

4. The microphone module as described in claim 3, wherein the shell comprises a substrate and a plurality of sealing rings, there is a plurality of mounting portions corresponding to the sealing rings and provided on the substrate, each of the sealing rings is accommodated in the corresponding mounting portion, the printed circuit board is connected with the sealing rings, a center hole of each of the sealing rings is served as the neck portion of the corresponding second sound pickup hole in the conical funnel type, there is a plurality of first through holes provided on the substrate, each of the center holes and each of the first through holes are in one-to-one correspondence, each of the first through holes is served as the conical portion of the second sound pickup hole in the conical funnel type.

5. The microphone module as described in claim 4, wherein each of the sealing rings is threaded in the corresponding mounting portion or is an interference fit with the corresponding mounting portion.

6. The microphone module as described in claim 3, wherein a distance between the neck portion of each of the second sound pickup holes in the conical funnel type is greater than or equal to 4D1 mm and less than or equal to 5D1 mm.

7. The microphone module as described in claim 4, wherein a distance between the neck portion of each of the second sound pickup holes in the conical funnel type is greater than or equal to 4D1 mm and less than or equal to 5D1 mm.

8. The microphone module as described in claim 5, wherein a distance between the neck portion of each of the second sound pickup holes in the conical funnel type is greater than or equal to 4D1 mm and less than or equal to 5D1 mm.

9. The microphone module as described in claim 1, wherein all of the MEMS microphones are set along the same straight line in the same order.

10. The microphone module as described in claim 1, wherein a distance between a surface of a side of the printed circuit board close to the shell and a surface of a side of the shell away from the printed circuit board is less than 7 mm.

* * * * *